(12) United States Patent
Bronson

(10) Patent No.: US 10,342,300 B2
(45) Date of Patent: Jul. 9, 2019

(54) CLOSURE MEMBERS

(71) Applicant: Adam Bronson, Stratford (CA)

(72) Inventor: Adam Bronson, Stratford (CA)

( * ) Notice: Subject to any disclaimer, the term of this patent is extended or adjusted under 35 U.S.C. 154(b) by 269 days.

(21) Appl. No.: 15/155,232

(22) Filed: May 16, 2016

(65) Prior Publication Data

US 2017/0325552 A1    Nov. 16, 2017

(51) Int. Cl.
*A44B 18/00* (2006.01)
*F16B 5/07* (2006.01)
*B62D 27/06* (2006.01)

(52) U.S. Cl.
CPC ............ *A44B 18/0065* (2013.01); *F16B 5/07* (2013.01); *B62D 27/06* (2013.01)

(58) Field of Classification Search
CPC ............ Y10T 24/2792; A44B 18/0019; A44B 18/0088; A44B 18/0065; A44B 18/00; A44B 18/0007; A44B 18/0015; A44B 18/0061; A44B 18/0053; A44B 18/0046; A44D 2205/00; F16B 5/07; B62D 27/06
USPC .......................................................... 24/452
See application file for complete search history.

(56) References Cited

U.S. PATENT DOCUMENTS

| | | | | |
|---|---|---|---|---|
| 3,440,696 A * | 4/1969 | Staller | ................... | B29C 47/128 24/586.1 |
| 3,557,413 A * | 1/1971 | Engle | ................. | A44B 18/0053 24/584.1 |
| 4,870,721 A | 10/1989 | Cohen | | |
| 5,212,855 A | 5/1993 | McGanty | | |
| 5,799,378 A * | 9/1998 | Gershenson | ....... | A44B 18/0053 24/452 |
| 5,983,467 A | 11/1999 | Duffy | | |
| 6,546,604 B2 * | 4/2003 | Galkiewicz | ........ | A44B 18/0053 24/306 |
| 7,946,766 B2 * | 5/2011 | Dais | ................... | B65D 33/2508 24/585.12 |
| 8,875,356 B2 * | 11/2014 | Zerfas | ................ | A44B 18/0007 24/114.6 |
| 2002/0184740 A1 * | 12/2002 | Meager | .................. | A44B 19/16 24/389 |
| 2003/0190451 A1 * | 10/2003 | Baker | ................ | A44B 18/0046 428/99 |
| 2007/0077390 A1 | 4/2007 | Yang | | |

(Continued)

OTHER PUBLICATIONS

Written Opinion issued in PCT/CA2016/000145, dated Jan. 23, 2017.

*Primary Examiner* — Robert Sandy
(74) *Attorney, Agent, or Firm* — Eugene J. A. Cierczak; Miller Thomson LLP

(57) ABSTRACT

A closure comprising: a first surface having a plurality of first projections extending outwardly from said first surface and terminating at a distal end to present a plurality of first heads respectively; a second surface having a plurality of second projections extending outwardly from said second surface and terminating at a distal end to present a plurality of second heads respectively; said plurality of first heads different from said plurality of second heads; whereby the space between adjacent first upstanding projections define a first cavity to capture said second heads of said second surface; and wherein the space between adjacent second upstanding projections to define a second cavity to capture said first heads of said first surface.

20 Claims, 12 Drawing Sheets

(56) References Cited

U.S. PATENT DOCUMENTS

2009/0119889 A1\* 5/2009 Tanaka ................. B29C 47/003
                                                            24/399

\* cited by examiner

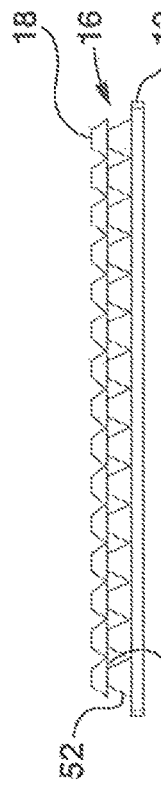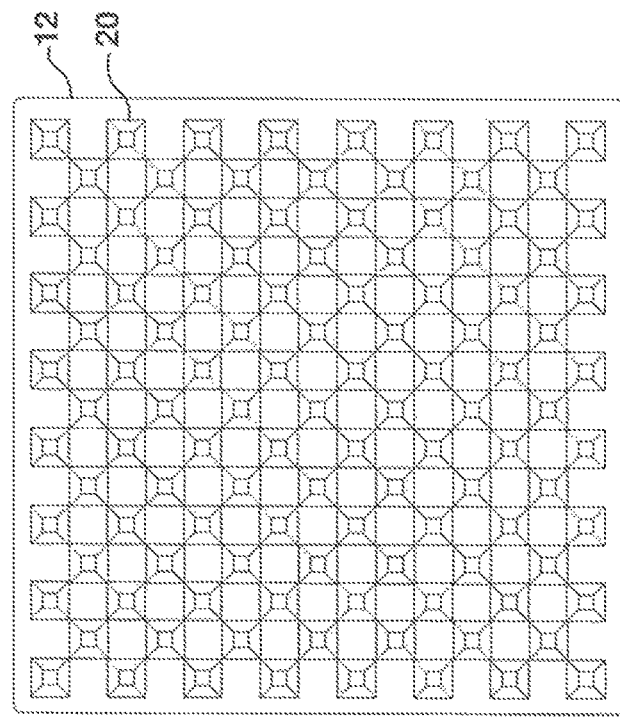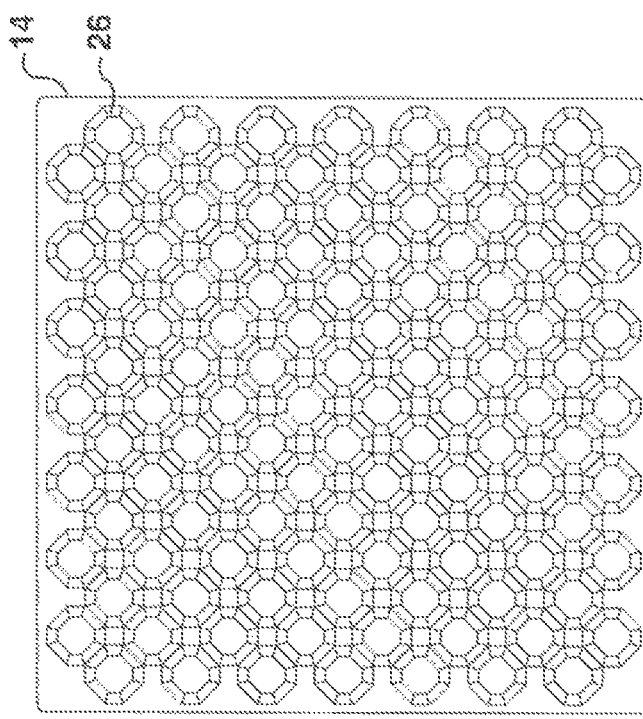

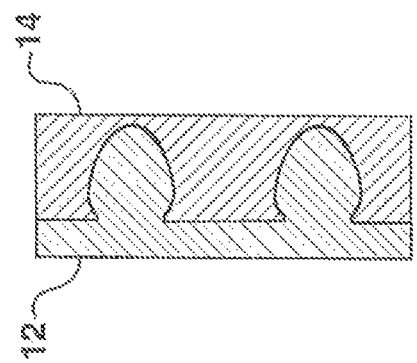
FIG. 31
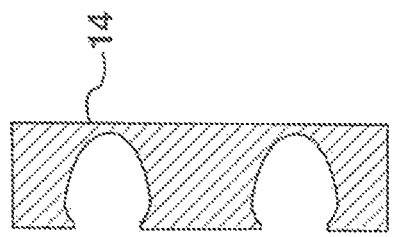
FIG. 30
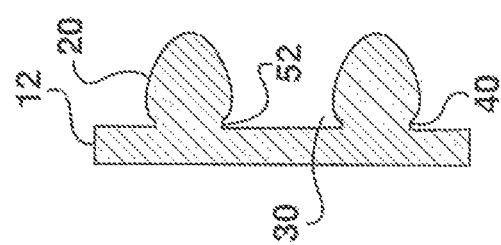

CLOSURE MEMBERS

FIELD OF INVENTION

This invention relates to fasteners or closures; and more particularly relates to interlocking fasteners that are removeably securable by pressure or touch and the method of fastening parts together.

BACKGROUND TO THE INVENTION

The prior art discloses many different types of fasteners; and particularly interlocking fasteners. For example U.S. Pat. No. 5,097,570 states that there are generally three types of interlocking fasteners, where one such type of interlocking fastener is commonly known as a "slide fastener" which typically includes two joinable members each with alternating ridges and cavities. The two members of the "slide fastener" are joined together by inserting the ridge of one member into the cavity of the other member. This type of interlocking fastener prevents the interlocking members from planar sliding but perpendicular movement of the interlocking members is hot prevented.

U.S. Pat. No. 5,097,570 goes on to state that a second type of interlocking fastener is commonly called a "zipper" fastener; while a third common type of interlocking fastener, is a "pressure-type" device commonly known as a "VELCRO"—type device or fastener. U.S. Pat. No. 5,097,570 relates to a fastener using manual pressure having two flexible opposed fastening members each of which has a plurality of alternating flexible burrs and burr seating cavities. The burrs of one member interdigitate with the burr cavities of the other member when pressed together.

Another arrangement is shown in U.S. Pat. No. 5,097,670 which discloses a touch fastener product where the fastener elements define a sufficient number and pattern of, pockets between associated group[s of adjacent stems to provide a desired bulk locking ratio when engaged with an identical pattern at a zero degree engagement angle.

Moreover U.S. Pat. No. 5,212,853 relates a separable fastener includes a pair of fastener pieces. Each of the fastener pieces includes a flat base and a plurality of elastic engagement projections provided on and integral with the base and arranged in a plurality of lateral and longitudinal rows. The engagement projections have respective heads of a uniform size. Each of the heads is supported on the base via a pair of leg pieces united at the upper end to opposed edge portions of the bottom of the head.

Yet another arrangement is shown in U.S. Pat. No. 5,579,562 which relates to an interengaging fastener including two fastener members and structure for locating one fastener member with respect to the other fastener member. In one embodiment, the locating structure includes a protrusion extending from one fastener member and an opening formed in the other fastener member.

Furthermore U.S. Pat. No. 5,834,245 illustrates a fastener having a first member and a second member, each member having structured surfaces thereon. The first member has two major surfaces oppositely disposed, at least a portion of each major surface having structured surfaces. The second member has at least one major surface having a structured surface. The first member is fastened to the second member when the two major surfaces of the first member are disposed between the structured surface of the second member and the elements of the structured surfaces bend and twist as well as frictionally adhere during attachment.

U.S. Pat. No. 5,671,511 refers to an inter engaging fastener member having a fabric layer; while U.S. Pat. No. 5,797,170 relates to a synthetic resin molded surface fastener.

U.S. Pat. No. 9,015,910 discloses a one piece multi-rib fastener including at least two groups of ribs, each rib with one or more hooks, wherein the groups are separated by a space less than the width of the maximum number of ribs within one of the groups.

U.S. Pat. No. 6,076,238 shows a mechanical fastener including a plurality of engaging stems located in unordered arrangements, which repeat on a substrate. A preferred embodiment of the invention provides a mechanical fastener with a plurality of repeating unordered arrangements, where the arrangements repeat in more than one direction. The unordered arrangements of the engaging stems allow pairs of the fasteners to interengage with themselves, or in other words, to self-mate. Additionally, the unordered arrangements of engaging stems allow the fasteners to interengage at any relative angular orientation with a relatively constant engagement force, and a relatively constant disengagement force regardless of their angular orientation. The unordered arrangements of engaging stems also allow pairs of fasteners to interengage at any relative planar position with a relatively constant engagement force and a relatively constant disengagement force regardless of their planar position U.S. Pat. No. 5,867,876 relates to a separable plastic male-to-male connector includes a pair of connector units each having a planar base and a plurality of protrusions extending outward from the base and being oriented on the base so as to form a matrix. The matrix has a plurality of lateral and longitudinal rows.

Finally U.S. Pat. No. 5,983,467 claims an interlocking device having a first portion including a first basal surface and a first plurality of islands provided thereon, each of said islands having a plurality of sidewalls; a second portion including a structure having a plurality of apertures formed therein and a plurality of walls defining said plurality of apertures; the first plurality of islands being positioned on said first basal surface and configured so that said first plurality of islands may be received in said plurality of apertures; and where the plurality of sidewalls and the plurality of walls being configured so that when the first plurality of islands is positioned in the plurality of apertures, application of a relative shearing force to the first and second portions causes ones of the plurality of sidewalls to slidingly engage corresponding respective ones of the plurality of walls until the ones of the plurality of sidewalls engage the correspondingly respective ones of the plurality of walls sufficiently to block further relative movement in a direction of the relative shearing force with the result that a greater force is required to remove the first plurality of islands from said plurality of apertures along an axis extending perpendicular to said first basal surface after application of said shearing force than before.

It is an object of this invention to provide an improved fastening device or closure which has a superior fastening capacity but reusable when desired.

It is another object of this invention to provide a closure or locking or joining device which requires less force to connect than to disconnect.

It is another object of this invention to provide a locking device which features substantially little if any lateral, diagonal, or vertical movement once the members or components are joined together.

It is an aspect of this invention to provide a closure comprising: a first surface having a plurality of resiliently deformable first projections extending outwardly from said first surface and terminating at a distal end to present a plurality of first heads respectively; a second surface defining a plurality of cavities for capturing said first heads of said first surface.

It is an aspect of this invention to provide a closure comprising: a first surface having a plurality of first projections extending outwardly from said first surface and terminating at a distal end to present a plurality of first heads respectively; a second surface having a plurality of second projections extending outwardly from said second surface and terminating at a distal end to present a plurality of second heads respectively; said plurality of first heads different from said plurality of second heads;

whereby the space between adjacent first upstanding projections define a first cavity to capture said second heads of said second surface; and wherein the space between adjacent second upstanding projections to define a second cavity to capture said first heads of said first surface.

It is another aspect of this invention to provide a closure assembly comprising: a first surface having a plurality of male projections extending axially outwardly from said first surface to present a plurality of male engagement members respectively; a second surface having a plurality of female projections extending axially outwardly from said second surface to define a plurality of female cavities to capture said plurality of engagement members respectively; wherein each said male projection presents a male shoulder intermediate said engagement member and said first surface, and each said female projection presents a female shoulder for engagement with said male shoulder, respectively.

Yet another aspect of this invention relates to method of securing two parts together where one part includes a plurality of first projections extending outwardly from said first part and terminating at a distal end to present a plurality of first heads and first cavities respectively, and a second part includes a plurality of second projections extending outwardly from said second part and terminating at a distal end to present a plurality of second heads and second cavities respectively;

moving such first part towards its second part; deforming said plurality of first and second heads to capture said first and second heads into said plurality of second cavities and said first cavities respectively.

These and other objects and features shall now be described in relation to the following drawings.

DESCRIPTION OF THE DRAWINGS

FIG. 9 is a side elevational view of female projections having a square head.

FIG. 10 is a top plan view of FIG. 9.

FIG. 11 is a side elevational view of male projections have a square head.

FIG. 12 is a top plan view of FIG. 11.

FIG. 30 is a cross sectional view of the closure showing oblong heads in an unlocked position.

FIG. 31 is a cross sectional view showing oblong heads in a locked position.

DETAILED DESCRIPTION OF THE INVENTION

Like parts have the same number throughout the figures.

This invention relates to a closure or closure assembly 10 having a first surface or part 12 and a second surface or part 14.

Figure 16:
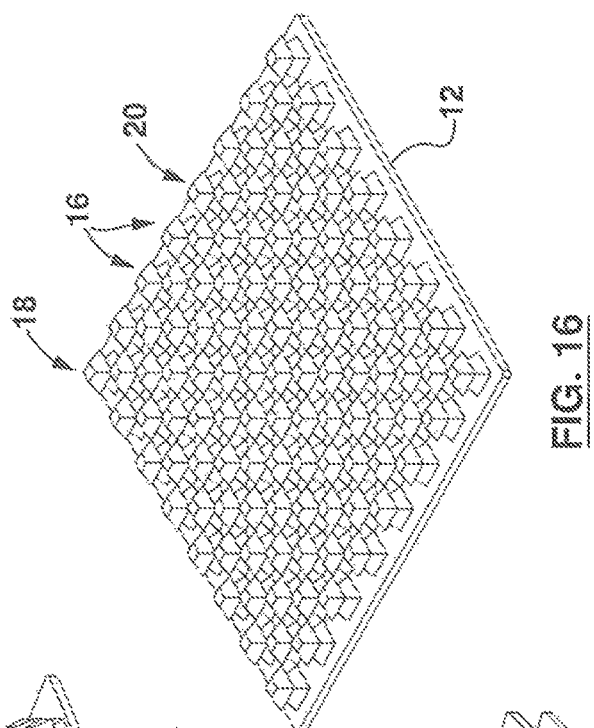
FIG. 16 is a perspective view of the first or male projections showing a square head.
Figure 15:
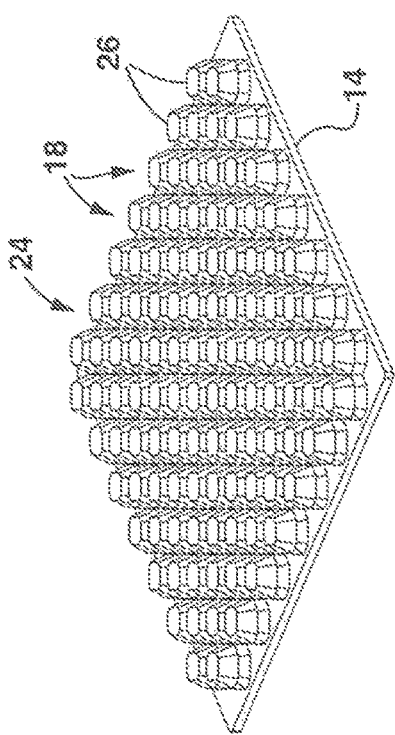
FIG. 15 is a perspective view of the second or female projections showing a square head.
Figure 17:
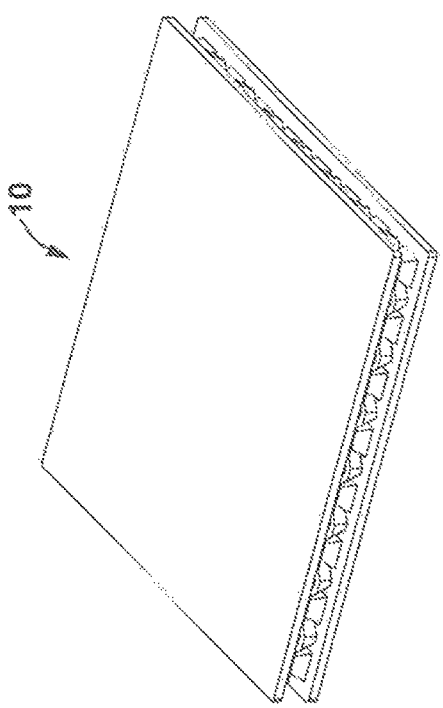
FIG. 17 is a perspective view of the closure in a locked position of the parts shown in FIGS. 15 and 16.
Figure 20:
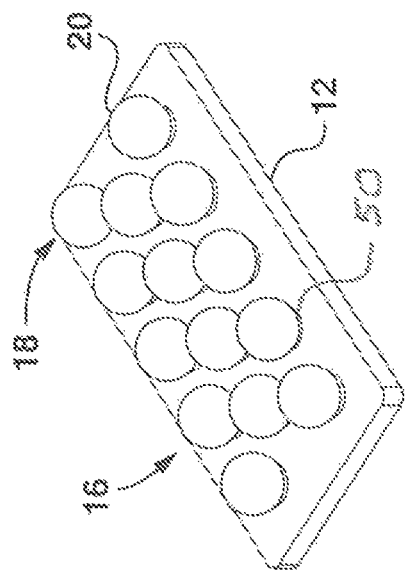
FIG. 20 is a perspective view of the male projections having a spherical head.
Figure 21:
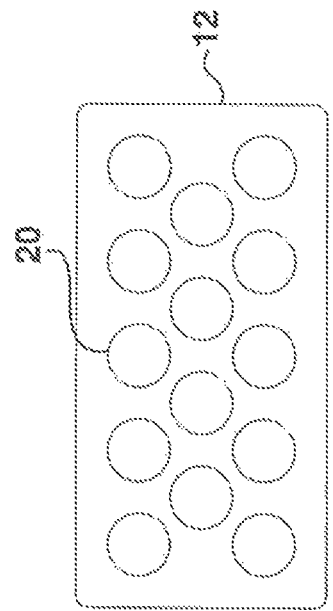
FIG. 21 is a top plan view of FIG. 17.
Figure 18:
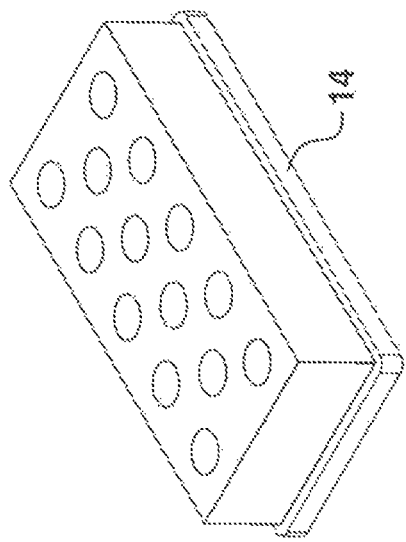
FIG. 18 is a perspective view of the female projections having spherical heads.
Figure 19:
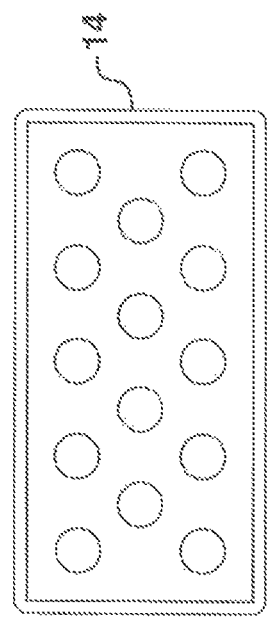
FIG. 19 is a top plan vie of FIG. 15.

The first surface 12 has a plurality of first projections 16 arranged for example as shown in FIG. 16 in an array or pattern. The second surface or part 14 has a plurality of second or female projections 18 arranged in a pattern or array as shown in FIG. 15.

The plurality of first projections 16 extend outwardly from the first surface 12 and terminate at a distal end 18 to present a plurality of first heads 20.

The second surface 14 has a plurality of second projections 18 extending outwardly from the second surface 14 and terminate at a distal end 24 to present a plurality of second heads 26.

The plurality of first heads 20 are different from the plurality of second heads 26.

The space or pocket between adjacent first upstanding projections 16 define a first cavity 30 to capture the second heads 26 of the second surface 14.

The space, pocket or recess between adjacent second upstanding projections 18 define a second cavity 32 to capture the first heads 20 of first surface 12.

The closure 10 illustrates that the first heads 20 are selected from the group of hexagonal cross sections as shown in FIGS. 2, 4, 4, 6, 7 and 8 or from first heads 20 having a square cross section as shown in FIGS. 11, 12, 13, 14 and 16; or the first heads are selected from round cross sections as shown in FIGS. 20, 21, 22, 23, 24 and 25; or the first heads 20 are selected from oblong or egg shaped cross sections as shown in FIGS. 26, 27, 30, 31 and 32.

The first upstanding projections 16 define a plurality of first cavities 30 and the second upstanding projections 18 define a second cavity 32 for capturing the first heads 20 and second heads 26 respectively.

The first and second heads 20 and 26 are tapered inwardly towards the distal ends 18 and 24 respectively.

The first upstanding projections 16 present an undercut 40 between the distal end 18 and the first surface 12. The second upstanding projections 18 presents an undercut 42 between the distal end 24 and the second surface 14. In the locked position as shown for example in FIG. 4 the undercuts 14 and 42 contact each other so as to capture the second and first heads 26 and 20 together respectively.

The closure as shown in the figures herein are made out of resiliently deformable material such as plastic or the like. In one embodiment the materials comprise polypropylene $(C_3H_6)_n$.

As shown herein the first and second projections 16 and 18 are resiliently deformable to capture the first head 20 of the first surface 12 in the second cavity 32 and the second head 26 of the second surface 14 in the first cavity 30, respectively in the locked position and release the first head 20 from the second cavity 32 and the second head 26 from the first cavity 30 in the unlocked position.

Furthermore the closure assembly discloses a first surface 14 having a plurality of male projections 16 extending axially outwardly from the first surface 12 to present a plurality of male engagement members at 20 respectively. There is a second surface 14 having a plurality of female projections 18 extending axially outwardly from the second surface 14 to define a plurality of female cavities, pockets or recesses 32 to capture the plurality of male engagement members 20 respectively.

The male projections 16 present a male shoulder 40 intermediate the male engagement member 20 and the first surface 12. Each female projection 18 presents a female shoulder 42 for engagement with the male shoulder 40 respectively.

Each male projection 16 presents a stem portion 50 terminating at a distal end 18 to present the male engagement member 20.

Each female projection 18 presents a female stem 52 terminating at a distal end 24 for capturing the male engagement members 20 as described.

The male projections 16 and female projections 18 are deformable to capture the male engagement member 20 in the female cavity or pocket 32 in a locked position and release the male engagement member 20 from the female cavity 32 in an unlocked position.

As stated the male engagement members 20 are selected from the group of hexagonal, square, round and oblong radial cross sections. The male engagement members 20 are tapered inwardly toward the distal end 18.

Furthermore the female capture members 18 are tapered inwardly toward the distal end. The female capture members 18 are selected from the group defining a cavity 32 of hexagonal, square, round and oblong radial cross sections.

The male shoulder 40 presents an undercut between the engagement member 20 and the male stem 50. The capture member presents the female shoulder 42 which presents an undercut to contact the undercut 40 of the male engagement member 20 to capture the engagement member 20.

The female capture members 18 are resiliently deflectable to capture the male engagement members 20. More particularly the female projections 18 deform to capture the male engagement members 20 in a locked position and release the engagement members of the male projections 16 in an unlocked position.

Figure 6:
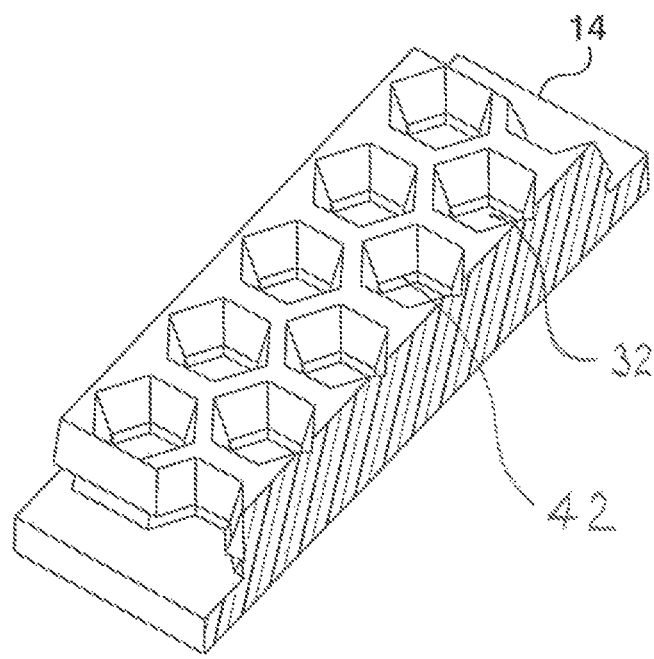
FIG. 6 is a perspective view of another embodiment of the invention where the second surface includes a plurality of cavities.
Figure 7:
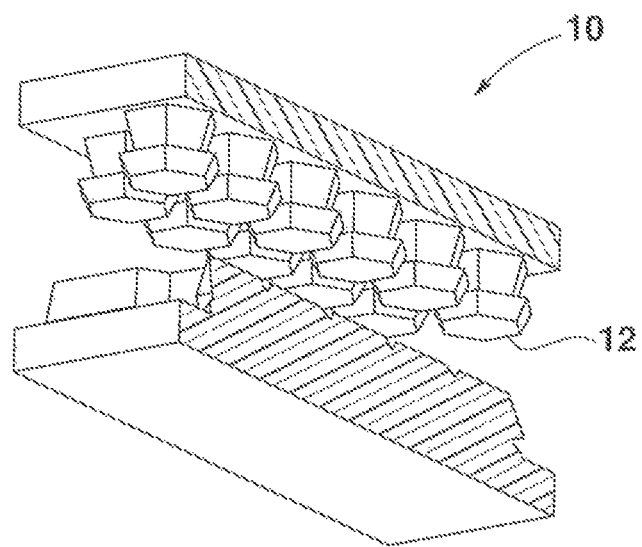
FIG. 7 is a perspective view of the closure in an unlocked position.
Figure 8:
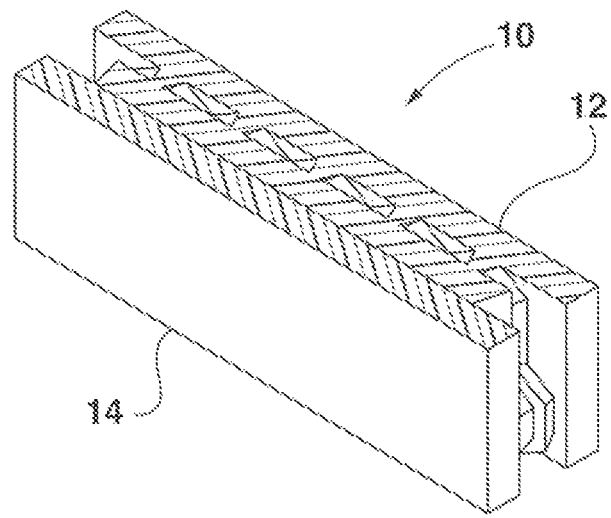
FIG. 8 is a perspective view of the closure in a locked position showing hexagonal heads.
Figure 14:
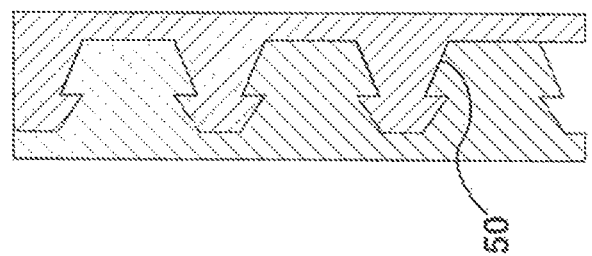
FIG. 14 is a side elevational view of square heads in a locked position.
Figure 13:
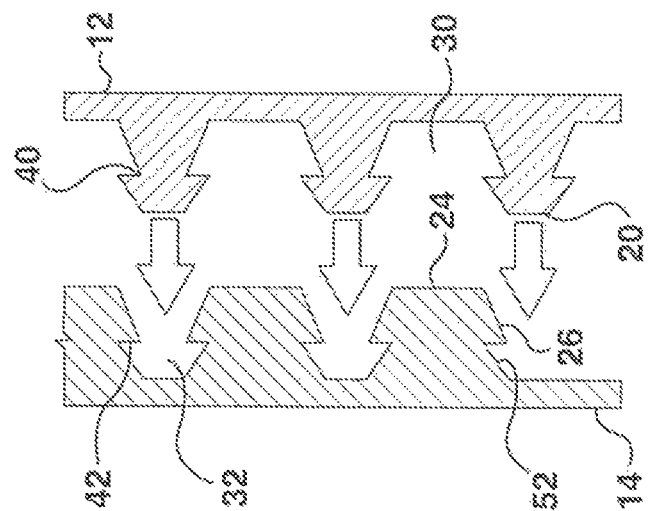
FIG. 13 is a side cross sectional view of square heads in an unlocked position.

FIG. 6 illustrates another embodiment of the invention whereby the second surface 14 includes a plurality of cavities or recesses 32 for capturing the plurality of deformable male engagement members 20. More specifically the plurality of cavities present an undercut or female shoulder 42 to contact the undercut 40 of the male engagement member 20 to capture the engagement member 20 as the deformably resilient male engagement members 20 are forced into the cavities 32 respectively. The second member 14 can comprised of a rigid material such as metal or the like. Such arrangement can be used for a substantially one time use; in other words once the male engagement members are placed into the cavities then the first surface is substantially permanently fixed to the second surface as the male projections would need to be destroyed before the first surface 14 could be removed from the second surface 14. Alternatively the material of the male engagement members 20 can be selected so that the flexibility or deformability would increase upon being subjected to a temperature increase so as to make it easier to bond to the second surface 14 or cavities 32.

Figure 1:
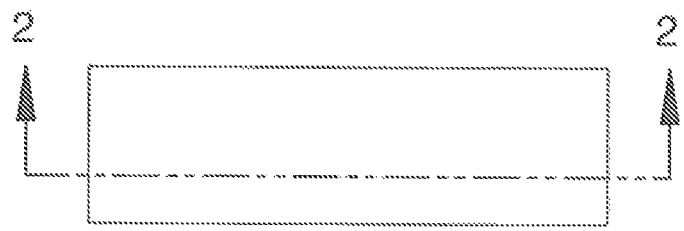
FIG. 1 is a top plan view of the closure in an unlocked position.
Figure 2:
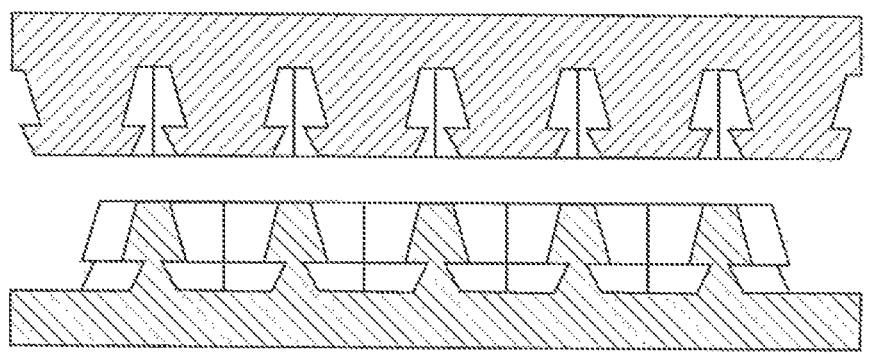
FIG. 2 is a side cross sectional view of the closure taken along the lines 2-2 of FIG. 1.
Figure 3:
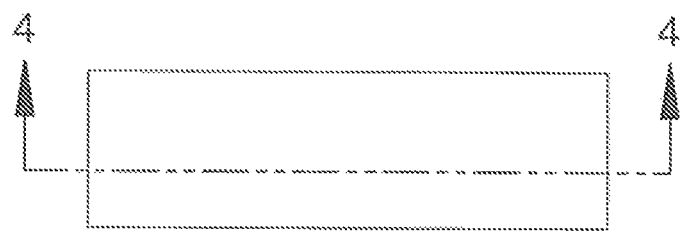
FIG. 3 is a top plan view of the closure in a locked position.
Figure 4:
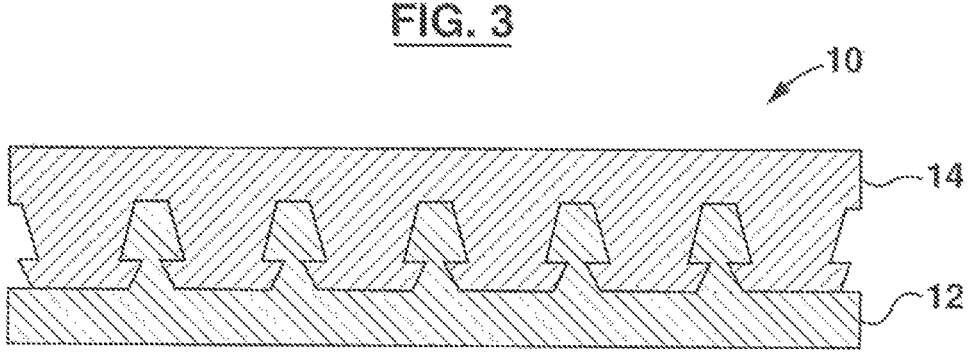
FIG. 4 is a side cross sectional view of the closure in a looked position taken along the lines 4-4 of FIG. 3.
Figure 5:
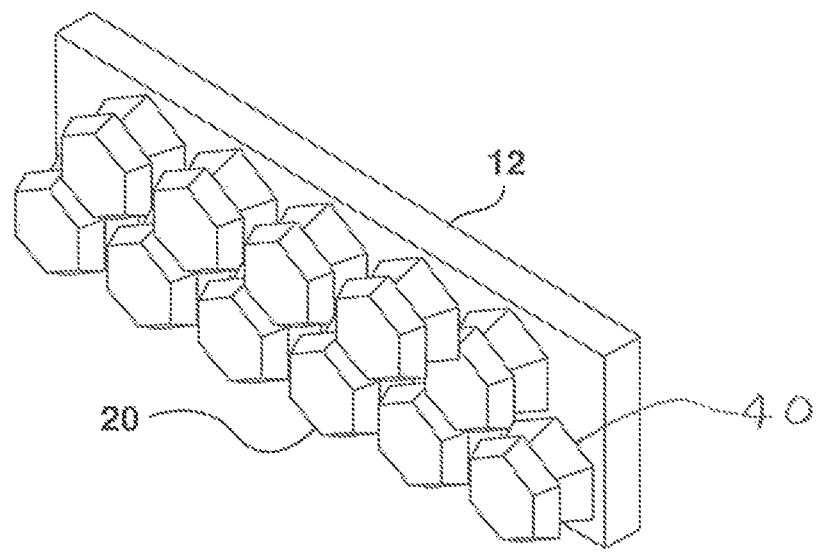
FIG. 5 is a perspective view of the male heads extending from a first surface.

The embodiment shown in FIGS. 5 and 6 could be used in the automotive field to substantially permanently affix automotive parts to a chassis such as a fender for example. In another embodiment one or both of the surfaces 12 and 14 are molded into manufactured components. An example would be beams for construction which snap together, or automotive components that have one of surfaces 12 or 14 molded into them.

Furthermore the bonding strength between the surfaces 12 and 14 could be selected by selecting the materials of the male projections, female projections and/or cavities.

The invention defined herein also relates to a method of securing two parts 12 and 14 together where one part 12 includes a plurality of first projections 16 extending outwardly from the first part 12 and terminating at a distal end 18 to present a plurality of first heads 20 and first cavities 30 respectively and a second part 14 which includes a plurality of second projections 18 extending outwardly from the second part 14 and terminating at a distal end 24 to present a plurality of second heads 26 and second cavities 32 respectively for:
  (a) moving the first part 12 towards the second part 14;
  (b) deforming the plurality of first and second heads 20 and 26 to capture the first and second heads 20 and 26 into the plurality of second cavities 32 and first cavities 30 respectively.

The first and second parts 12 and 14 are pressed together to a locked position.

The method described herein also illustrates that the force to unlock the first part 12 from the second part 14 is greater than the force to lock the first part to the second part.

FIGS. 18, 19, 20, 21, 22, 23, 24 and 25 illustrate the invention in relation to round heads or spherical heads. More particularly the second female projections includes a cavity that presents a recess 51 adapted to receive the heads 20 of the male projections 16.

Figure 23:
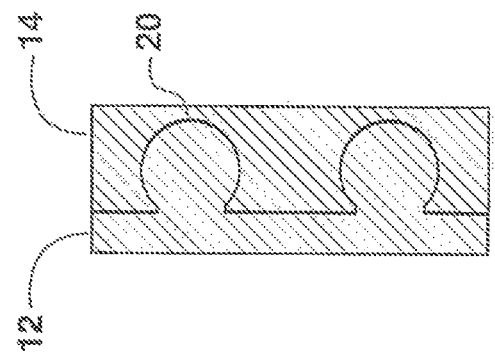
FIG. 23 is a side elevational cross sectional view of FIG. 19 in a locked position.
Figure 22:
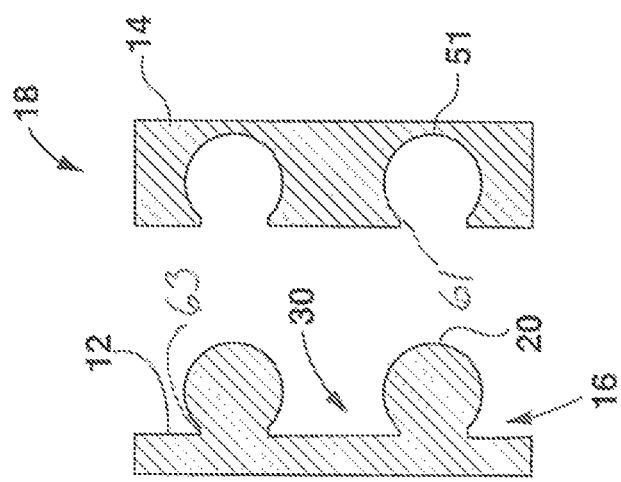
FIG. 22 is a side cross sectional view of the closure having spherical heads in an unlocked position.
Figure 25:
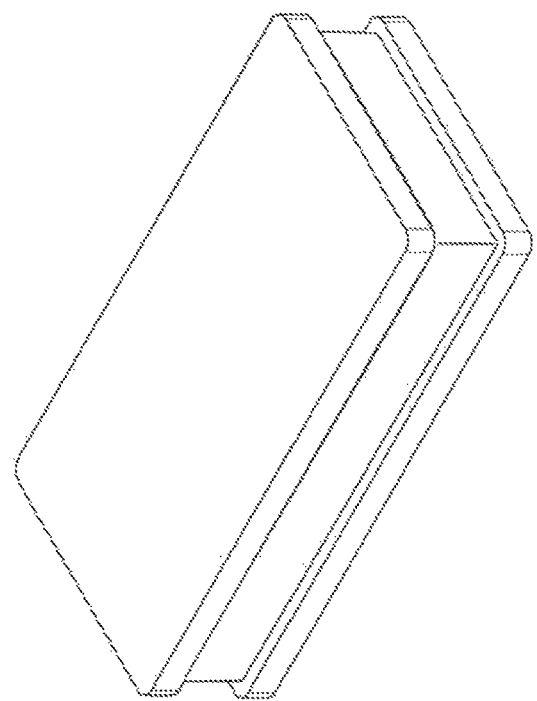
FIG. 25 is a perspective view of the closure having spherical heads in a locked position.
Figure 24:
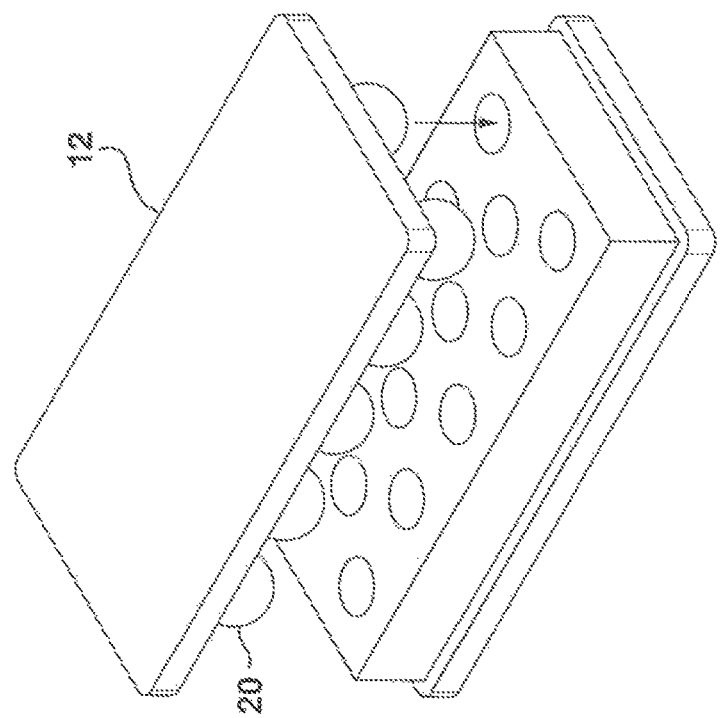
FIG. 24 is a perspective view of the closure having spherical heads in an unlocked position.
Figure 28:
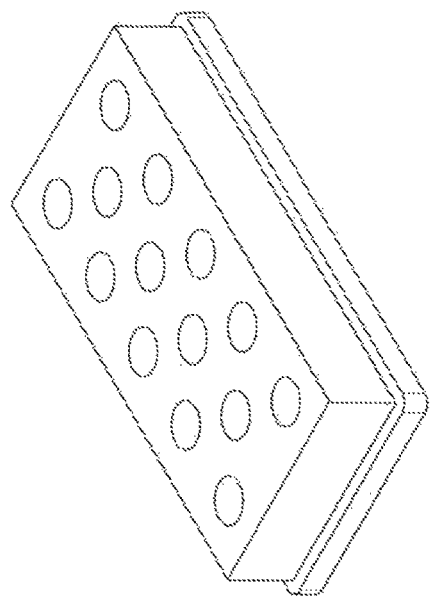
FIG. 28 is a perspective view of the female projections for capturing the heads of FIG. 23.
Figure 29:
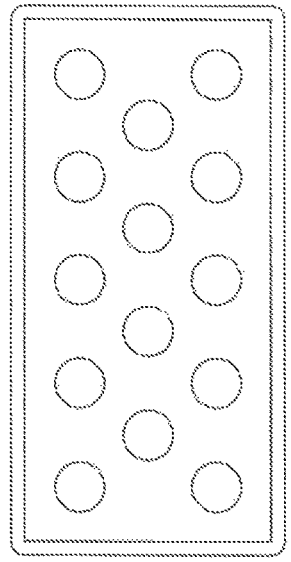
FIG. 29 is a top plan view of FIG. 25.
Figure 26:
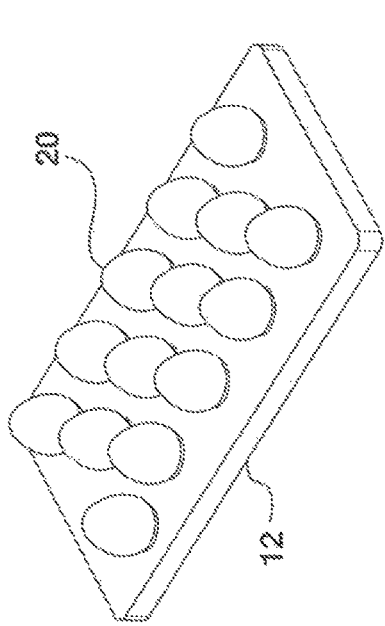
FIG. 26 is a perspective view of the closure having male oblong heads.
Figure 27:
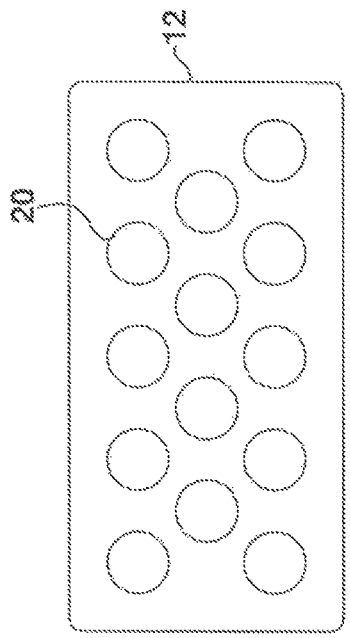
FIG. 27 is a top plan view of FIG. 23.
Figure 33:
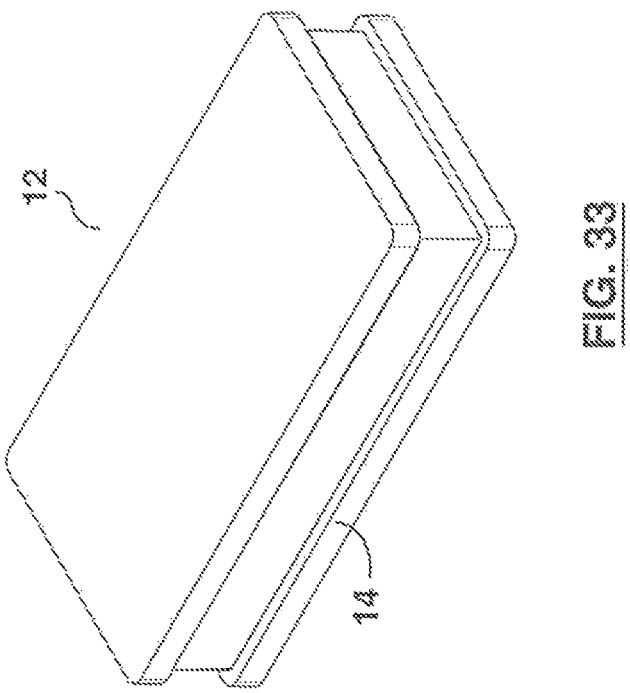
FIG. 33 is a perspective view of the closure shown in FIG. 29 in a locked position.
Figure 32:
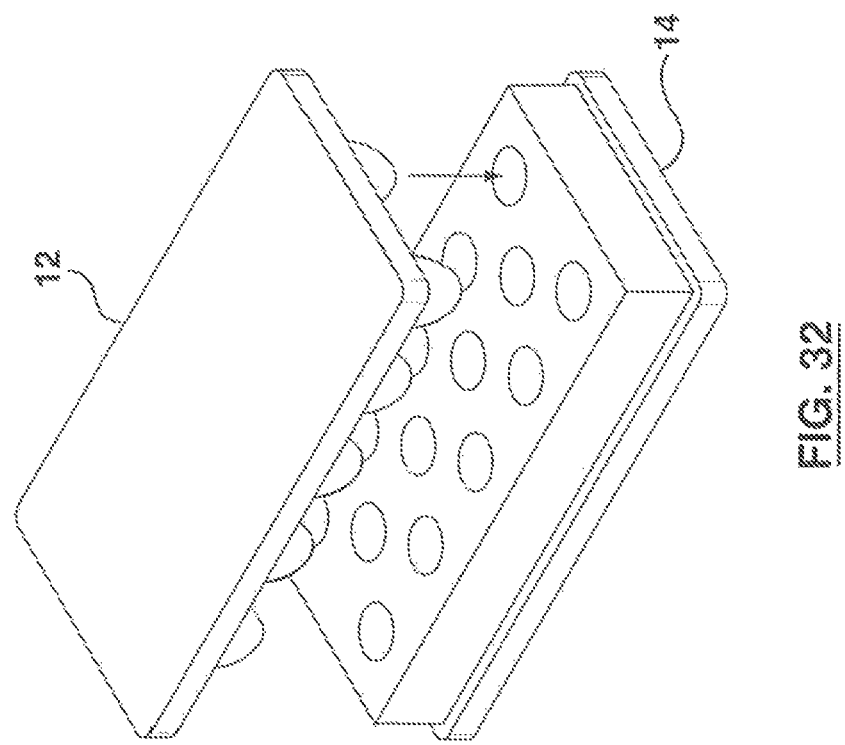
FIG. 32 is a perspective view of the closure showing oblong heads in an unlocked position.

FIGS. 22 and 23 illustrate that the length of the female stem engagement edge 61 can be selected to correspond to the length 63 of the stem 50 of the male engagement member so as to select the engagement force and separation force required between surfaces 12 and 14. In other words if the length of 61 and 63 is increased the force required to separate the members 12 and 14 is also increased. Accordingly the resiliency of the materials and length of the stem and edge 61 and 63 can be selected to provide different bond forces between the parts.

FIGS. 26, 27, 28, 29, 30 and 31 illustrate the invention in relation to oblong or egg shaped male engagement heads 20.

Again adjacent female projections 18 will deflect or deform in order to capture the male oblong heads 20.

The invention as described herein provides a substantially permanent locking mechanism when needed, but also a reusable one when desired. Furthermore the invention provides joining the two components 12 and 14 together either by applying sides 12 and 14 to two other materials, or by incorporating the projections 12 and 14 at the manufacturing stage into the components, materials or surfaces of the finished goods. For example the projections could be applied to molded components such as car dashboards where the shape of the molded part is directly in the form of the dashboard. The invention as described herein includes parts 12 and 14 which use distinctively different male and female projections as described. Furthermore the closure device 10 leaves substantially no tangible air between the male and female projections and as such could be additionally melded or adhesively bonded together for further strength.

Moreover the size of dimensions of the various projections could be selected so as to provide a substantially permanent bond or reusable depending on the size or thickness selected.

Furthermore the closure device 10 features substantially no lateral, diagonal or vertical movement within the components once joined.

The invention claimed is:

1. A closure comprising:
   a. a first surface having a plurality of spaced first projections extending outwardly from said first surface and where each of said first projections has the same shape;
   b. a second surface having a plurality of spaced second projections extending outwardly from said second surface and where each of said second projections has the same shape wherein the shape of said second projections are different from the shape of said first projections;
   c. wherein adjacent first upstanding projections define a first cavity having the same shape as each of the second projections to capture said second projections of said second surface; and
   d. wherein adjacent second upstanding projections define a second cavity having the same shape as each of said first projections to capture said first projections of said first surface.

2. A closure as claimed in claim 1 wherein each first projection terminates at a distal end to define a first head and each said second projection terminates at a distal end to define a second head and wherein said first and second heads are selected from the group of hexagonal, square, round and oblong shapes.

3. A closure as claimed in claim 1 wherein each said first projections are plastic and each said second projections are metal.

4. A closure as claimed in claim 2 wherein said first and second heads are tapered inwardly toward said distal end of said first and second projections respectively.

5. A closure as claimed in claim 4 wherein each said first and second upstanding projections present an undercut between said distal end and said first and second surfaces respectively to capture said second and first heads together respectively.

6. A closure as claimed in claim 5 wherein said closure is plastic.

7. A closure as claimed in claim 6 wherein each one of said first and second projections are resiliently deformable:
   a. wherein each one of said first heads of said first surface is captured in one of the said second cavities; and each one of said second heads of said second surface is captured in one of said first cavities in a locked position and;
   b. wherein each one of said first heads is released from one of said second cavities; and each one of said second heads is released from one of said first cavities in an unlocked position.

8. A closure assembly comprising:
   a. a first surface having a plurality of male projections extending axially outwardly from said first surface to define a plurality of male engagement members respectively;
   b. a second surface having a plurality of female projections extending axially outwardly from said second surface to define a plurality of female cavities to capture said plurality of engagement members respectively;
   c. wherein each said male projection presents a male shoulder intermediate said engagement member and said first surface, and each said female projection has a female shoulder for engagement with said male shoulder, respectively; and
   d and wherein said first and second shoulders are linear.

9. A closure assembly as claimed in claim 8 wherein each said male projection comprises a stem portion terminating at a distal end to define said engagement member.

10. A closure assembly as claimed in claim 9 wherein said engagement members have substantially the same shape as the female cavities and one of said engagement members is captured by one of said female cavities.

11. A closure assembly as claimed in claim 10 wherein said male and female projections are deformable to capture said male engagement member in said female cavity in a locked position; and release said male engagement member from said female cavity in an unlocked position.

12. A closure assembly as claimed in claim 11 wherein said male engagement members are selected from the group of hexagonal, square, round, and oblong shapes.

13. A closure assembly as claimed in claim 12 wherein said engagement members are tapered inwardly towards said distal end.

14. A closure assembly is claimed in claim 13 wherein said female capture members are selected from the group defining a cavity of hexagonal, square, round and oblong shape.

15. A closure assembly as claimed in claim 14 wherein said male shoulder presents an undercut between said engagement member and said male stem, and each said capture member and said female shoulder presents an undercut to contact said undercut of said male engagement members in a locked position.

16. A closure assembly as claimed in claim 10 wherein said female capture members are resiliently deflectable to capture said engagement member.

17. A closure assembly as claimed in claim 16 wherein said female projections deform outwardly to capture said engagement members of said male projections in a locked position and release and engagement member of said male projections in an unlocked position.

18. A method of securing a first and second part together where one part includes a plurality of first projections extending outwardly from said first part and terminating at a distal end to present a plurality of first heads and a plurality of first cavities respectively, and a second part includes a plurality of second projections extending outwardly from said second part and terminating at a distal end to present a plurality of second heads and plurality of second cavities respectively; comprising:

a. providing
    (i) each of the first projections with the same shape, and each of said first cavities with the same shape;
    (ii) each of the second projections with the same shape, and each of said second cavities with the same shape;
    (iii) where the shape of the second projections are different from the shape of the first projections;
    (iv) the shape of each of said first cavities is the same shape as each of said second projections; and
    (v) where the shape of each of said second cavities is the same shape as each of said first projections;
  b. moving said first part towards said second part;
  c. deforming said plurality of first and second heads to capture said first and second heads into said plurality of second cavities and said first cavities respectively.

19. A method as claimed in claim 18 wherein said first part is pressed toward said second part in a locked position.

20. A method as claimed in claim 19 wherein the force to unlock the first part from said second part is greater than the force to lock the first part to said second part.

* * * * *